(12) United States Patent
Bosch et al.

(10) Patent No.: US 7,235,940 B2
(45) Date of Patent: Jun. 26, 2007

(54) TORQUE LIMITING DEVICE FOR AN ELECTRIC MOTOR

(75) Inventors: Volker Bosch, Stuttgart (DE); Bernd Wirnitzer, Leinfelden-Echterdingen (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 10/933,857

(22) Filed: Sep. 3, 2004

(65) Prior Publication Data
US 2005/0057207 A1  Mar. 17, 2005

(30) Foreign Application Priority Data
Sep. 11, 2003 (DE) .................. 103 41 975

(51) Int. Cl.
*H02P 7/00* (2006.01)
(52) U.S. Cl. ............... 318/432; 318/434; 318/599; 318/811; 388/811; 388/837; 173/4
(58) Field of Classification Search ........ 318/432–434, 318/599, 811; 388/809, 811, 815, 822, 823, 388/937; 173/4, 11
See application file for complete search history.

(56) References Cited

U.S. PATENT DOCUMENTS 5,014,793 A * 5/1991 Germanton et al. ........ 173/181
5,154,242 A * 10/1992 Soshin et al. ............... 173/178
5,285,857 A * 2/1994 Shimada ....................... 173/1
5,440,215 A * 8/1995 Gilmore ..................... 318/432
6,607,385 B1    8/2003 Sevcik et al.
6,680,595 B2 * 1/2004 Ito .............................. 318/434

FOREIGN PATENT DOCUMENTS

| EP | 1 226 789 A2 | 7/1992 |
| EP | 0 555 8444 A1 | 8/1993 |
| JP | 4-2711 | 1/1992 |
| JP | 4-343636 | 11/1992 |

OTHER PUBLICATIONS

Patent Abstracts of Japan JP-09136144 A, May 27, 1997.

* cited by examiner

*Primary Examiner*—Rina Duda
(74) *Attorney, Agent, or Firm*—Michael J. Striker

(57) ABSTRACT

A rotary speed limiting device for an electric motor has a current detecting device for detecting a motor current of the electric motor, a nominal value setting for adjusting a torque, a control and/or regulating device which limits the motor current to a maximum value depending on the nominal value setting, a rotary speed detecting device for detecting a rotary speed of the electric motor, the control and/or regulating device determining a maximum value of the motor current depending on the rotary speed determined by the rotary speed detecting device.

6 Claims, 2 Drawing Sheets

TORQUE LIMITING DEVICE FOR AN ELECTRIC MOTOR

BACKGROUND OF THE INVENTION

The present invention relates to a torque limiting device for an electric motor.

Electric motors are used in the most diverse and different areas. For example, the electric motors are used in electric tools and serve for driving an insertion tool. Depending on the area of application of the tool and/or the properties of the material to be treated and/or workpiece, it is frequently required that a predetermined torque must not be exceeded on the insertion tool, since otherwise the damages and/or destruction of the insertion tool or the workpiece can occur. For example, it is known in electric screwdrivers, depending on the density of the material which receives the screws and/or the size or geometry of the screws, to provide a torque increase in the course of the screwing process. In this case a torque can be reached such that the material structure of the screw and/or of the workpiece is loaded so that this material structure breaks up.

Situations are known, in which for example a screw is screwed with an electric screwdriver with a high rotary speed into a workpiece. When the end position of the screwing is reached from a high rotary speed, so that the screw head mechanically limits the further rotation of the screw, the screw, insertion tool and/or workpiece can be damaged, or the screwing can be performed with an unacceptably high torque and thereby in a faulty way. In unfavorable cases, the material structure of the screw and/or insertion tool and/or workpiece can be overloaded with the suddenly occurring torque peaks so great, that the material structure breaks up. This situation is known as a so-called "hard screw case".

Many measures have been taken to prevent the damage or breakup of the material in case of exceeding a maximum permissible torque. Mechanical safety clutches for this purpose are known, in which at reaching a preadjusted maximum permissible torque, the shaft associated with the electric motor is turned relative to the tool holder of the electric tool due to a predetermined slippage, so that the side associated with the tool can no longer be driven also when the motor or the parts associated with the motor, for example the transmission, run further. Mechanical safety couplings of this type have the disadvantage that they allow only a very inaccurate and in some cases only stepped adjustment of the maximum permissible torque. They further have a disadvantage that they are susceptible to a mechanical wear, and thereby the force transmission decreases in general and with increasing aging of the safety coupling. The through slippage with the adjusted maximum permissible torque is performed relatively inaccurately and within relatively great error intervals, so that the safety coupling interrupts the drive of the insertion tool at a torque which is lower than the preadjusted torque, and in many cases at reaching a higher torque, whereby a material damage can occur due to a torque-caused overloading.

Electronic torque limiting devices are also used, in which a motor current received from the electric motor is detected as a measure for the applied torque. Such devices operate inaccurately, since in particular at high spindle rotary speeds the torque which is actually occurs at the tool or at the workpiece with reaching of the predetermined motor current due to the predetermined maximum torque, is significantly greater than the adjusted limiting value. This phenomena occurs since after turning off of the motor current, due to kinetic energy in the rotating masses, these rotating masses because of their inertia have inclination to post-running. This post running is suddenly braked by the mechanical limit of the screw, which leads to formation of a torque which is independent from the drive. This phenomena acts in particular in the case of the above mentioned "hard screw case", when the braking from a high rotary speed is performed suddenly and jerky.

SUMMARY OF THE INVENTION

Accordingly, it is an object of the present invention to provide torque limiting device for an electric motor, which avoids the disadvantages of the prior art.

In keeping with these objects and with others which will become apparent hereinafter, one feature of the present invention resides, briefly stated in a rotary speed limiting device for an electric motor, comprising a current detecting device for detecting a motor current of the electric motor; a nominal value setting for adjusting a torque; a control and/or regulating device which limits the motor current to a maximum value depending on the nominal value setting; a rotary speed detecting device for detecting a rotary speed of the electric motor, said control and/or regulating device determining a maximum value of the motor current depending on the rotary speed determined by said rotary speed detecting device.

When the torque limiting device is designed in accordance with the present invention it has the advantage that the maximum value of the motor current which is provided from a torque nominal value setting, is determined in dependence on the rotary speed of the electric motor, whereby the torque peaks possible due to the kinetic energy of the rotating masses and occurring in hard screwing case can be included in the regulating and/or turning off criterium. For this purpose, additionally to a detection device for the motor current received during the operation of the motor, a rotary speed detection device is available. The rotary speed detected by the rotary speed detection device and the motor current registered by the current detection device are transmitted to a control and/or regulating device which places these parameters in a relation relative to one another.

In accordance with a setting of a maximum permissible torque, the control and/or regulating device determines a maximum motor current which is produced in presence of a predetermined rotary speed for a predetermined, maximum permissible torque, which must not be exceeded, so that the predetermined maximum permissible torque is not exceeded when the torque peak resulting from the rotating masses under load comes up.

The occurring torque is composed, as mentioned, of two components, and in particular a torque component determined by the motor current and a torque component produced by a rotary speed-independent kinetic energy of the rotating masses. The latter is determined by the control and/or regulating device by means of the detected motor rotary speed, for example is calculated or read from a curve or table in an electronic component.

In accordance with one embodiment of the invention, the maximum value of the motor current, at which a reduction or turning off must be performed, is reduced with increasing rotary speed of the motor. When the motor runs faster and therefore the inherent kinetic energy of the rotating masses is higher than during a slower rotary speed, the control and/or regulating device must adjust a lower motor current, to prevent that by the higher kinetic energy of the rotating masses an impermissible post-running occurs, which can lead to formation of a torque peak due to the inertia of the rotating masses and thereby to exceeding of the predetermined maximum permissible torque.

In accordance with a further embodiment of the invention, it is proposed that the control and/or regulating device turns off the motor current at reaching of the limiting value of the motor current determined from the parameters including a torque setting, a motor current and a rotary speed. For this purpose in particular a special load control element can be used. Such a load control element can obtain a corresponding signal from a control and/or regulating device, which leads to turning off of the motor current. This special load control element can be combined with an electric switch which is known from the prior art.

In accordance with a preferable embodiment of the invention, an operator can adjust the setting of the maximum permissible torque by means of an operating element, so that it can preselect a maximum torque which is especially suitable for a predetermined application and/or for use region which must not be exceeded. For this purpose an adjusting device is provided, which can be operated by an operator and inform the user-side setting of the maximum permissible torque to the control and/or regulating device through a suitable signaling so that the control and/or regulating device, based on this user setting, determines the maximum permissible motor current depending on the rotary speed.

In accordance with a preferable embodiment of the present invention, the control and/or regulating device has a microcontroller. It performs the conversion of the parameters including a torque setting, a rotary speed and a motor current into an operating criterium and generates a corresponding regulating or turning off signal. This regulating or turning off signal is supplied to the load control element, which carries the above described motor current reduction or motor current turning off.

In accordance with an especially advantageous embodiment of the present invention, the control and/or regulating device is formed in general as a microcontroller.

The rotary speed detecting device in accordance with an embodiment of the invention operates so that a rotary speed sensor registers the revolutions of the shaft. This can be performed for example by a rigid mechanical coupling of the sensor with the shaft, or for example by a photoelectric element connected with a marking or a notching of the shaft, or a wheel which is placed on the shaft, and periodically interrupts the path of rays of the photoelectric element or by use of a so-called taco generator which produces a rotary speed-dependent signal voltage.

In another embodiment the rotary speed detecting device derives the rotary speed during the operation of the electric motor from such parameters as a motor voltage and a motor current, calculates them or reads a table or a curve stored in an electronic component. In this way advantageously a mechanical or a partial mechanical rotary speed detection is not needed, and no changes or structural operations in the electrical-mechanical construction, in particular the drive line between the motor and the force take off point are needed. In particular, in this embodiment an integration of the invention in the existing machines and devices is possible, that have an electric motor with a torque which must not exceed a predetermined maximum value.

The produced rotary speed-dependent signal can be supplied in particular as a rotary speed directly or as a signal via a computing step, to the control and/or regulating device, wherein the control and/or regulating device performs the evaluation of the signal.

A preferable embodiment of the invention resides in its use in electric tools, for example electric screwdrivers For this purpose in a very advantageous manner damages to a tool or a workpiece or faulty screwing due to undesired exceeding of a maximum torque permissible during the application are avoided. The invention can be integrated in the known electric tools, since due to the electrical operation, they it does not change the principle mechanical and electrical construction of the tool. This is especially the case when the rotary speed determination is performed on the basis of the electrical variables, such as a motor current and a motor voltage. Moreover, it can be provided that a product row, for example an electric tool with the invention, is performed in another, electrically and mechanically otherwise identical way, wherein in a very advantageous manner the available production capabilities can be used in an optimal manner.

The present invention also deals with a method of a limiting a torque for an electric motor, in particular for an electric motor of an electric tool, which includes the following steps: Nominal value setting of a maximum torque, determination of a rotary speed of the electric motor, determination of a motor current, determination of a maximum motor current of the electric motor depending on the nominal value setting of the maximum torque, in dependence on the rotary speed.

For the operation of the invention it is not important whether the rotary speed is determined on the motor shaft or on another component of the machine or a device which is associated with the motor shaft and turns because of the motor movement, as long as the control and/or regulating unit carries out computations of the rotary speed tapping of the same, for example by a suitable computing process.

The novel features which are considered as characteristic for the present invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF THE PREFERRED EMBODIMENTS

Figure 1:
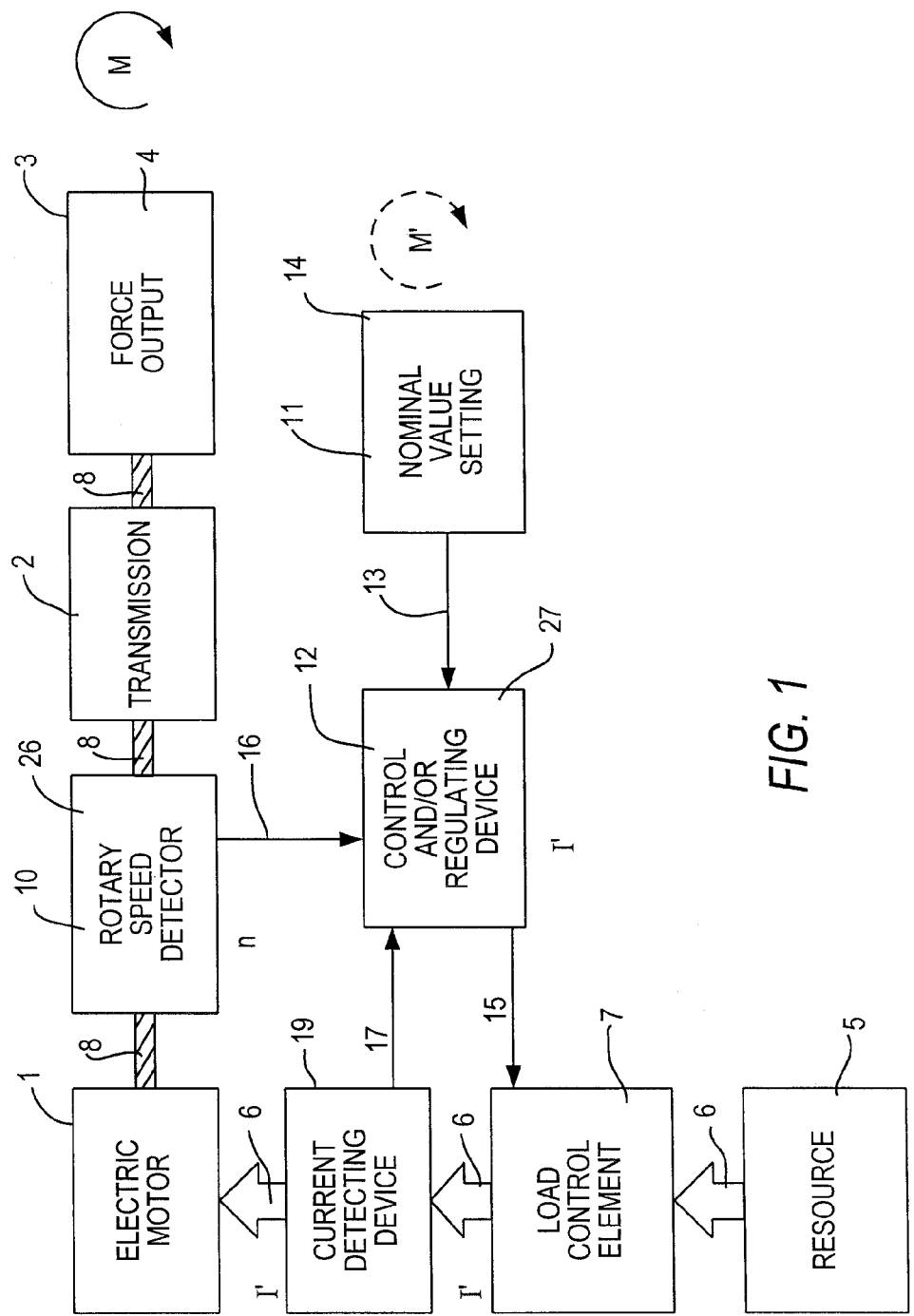
FIG. 1 is a view showing a rotary speed limiting device in accordance with the present invention in form of a block diagram.

FIG. 1 shows an electric motor 1 with a transmission 2 and a force output 3 associated therewith. The force output 3 can be formed, for example, as a clamping chuck 4. The drawing further shows a rotary speed detecting device 10 formed as a mechanically coupled rotary speed sensor 26, a current detecting device 9, a nominal value setting 11 formed as an operator element 14, a control and/or regulating device 12, and a load control element 7.

The operator can fix a maximum torque M' occurring on the force output 3, by means of the nominal value setting 11 formed as the operating element 14. The maximum permissible torque M' adjusted by the operator on the nominal value setting 11 is transmitted from it by means of a torque setting signal 13, to the control and/or regulation device 12.

The electric motor 1 is supplied from a not illustrated electrical energy source 5 with a motor current 6, which passes through the load control element 7. This leads to a start of the electric motor 1 and to a rotation movement of a transmission which is mechanically connected, for example with a shaft 8, and to the force output 3. The movement energy supplied in form of rotation from the electric motor 1 acts on the force output 3, for example a clamping chuck 4, for the formation of a torque M, when a load, for example a screw to be rotated, is connected. The motor current 6 received during the operation of the electric motor 1 is determined by a current detecting device 9 associated with the electric motor 1. The rotary speed of the electric motor is detected by the rotary speed detecting device 10 associated with the electric motor 1.

For preventing exceeding of the preadjusted maximum torque M' at the force output 3 (M>M') by a torque peak due to the rotating masses of the electric motor 1, the shaft 8, and the transmission 2 and the inner, rotary speed-dependent kinetic energy of the force output 3, during the operation of the electric motor 1 its rotary speed n is transmitted via the rotary speed signal 16 to the control and/or regulating unit 12. It determines, depending on the rotary speed n during reaching the preadjusted maximum torque M', a permissible maximum motor current I' which is in relationship with the actual motor current 6, that is determined via the current detecting device 9 and transmitted to the control and/or regulating device 12 via the current signal 17. When the motor current 6 reaches the maximum permissible motor current I' determined by the control and/or regulating device 12, the control and/or regulating device 12 sends a switching signal 15 to the load control element 7, which limits the motor current 6 to the maximum permissible motor current I' or turns off the motor current 6. Thereby the sum of the rotary speed-dependent torque components, activated by the kinetic energy of the rotating masses, and the torque components which depend only on the actual motor current 6, does not exceed the maximum permissible torque M' on the power output 3.

Figure 2:
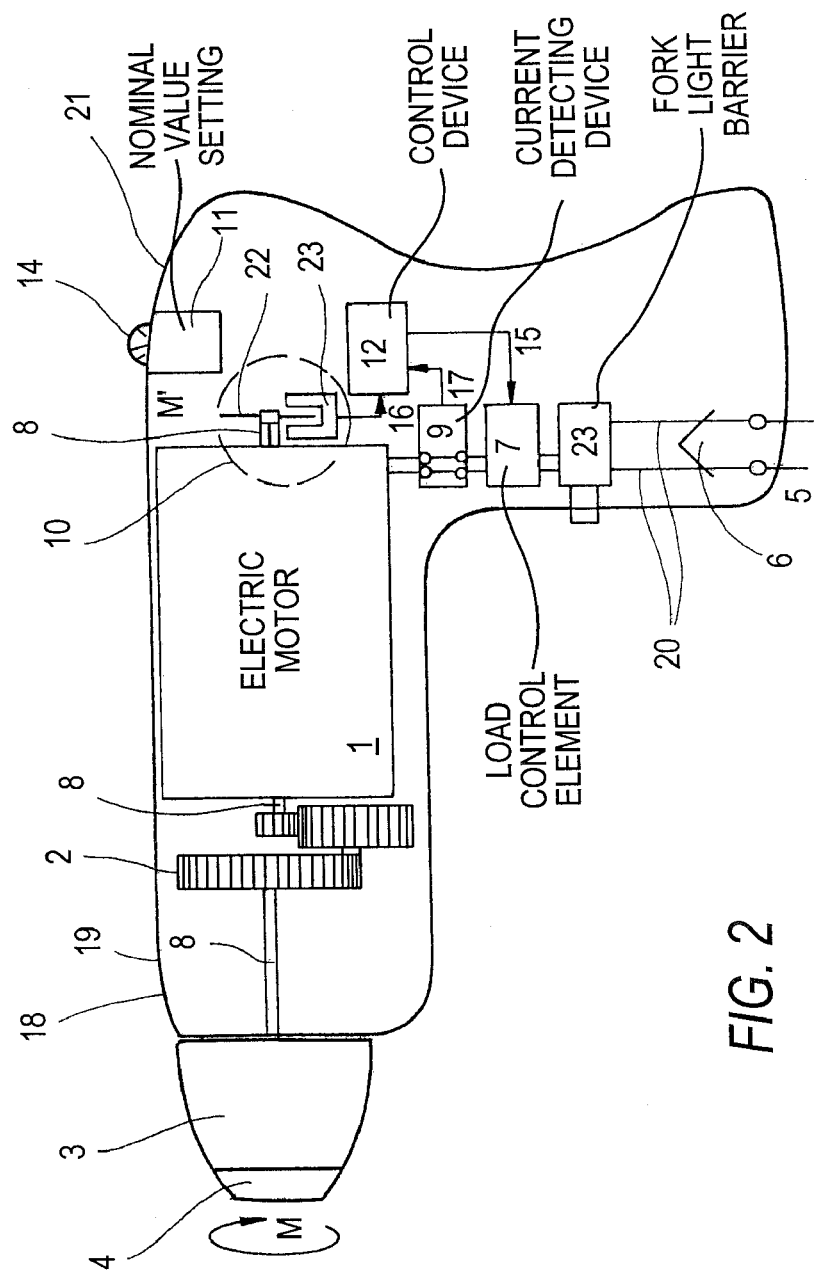
FIG. 2 is a view showing an electric tool, in particular an electric screwdriver with a torque limiting device in accordance with the present invention.

FIG. 2 shows an electric tool 18, namely an electric screwdriver 19. It has an electric motor 1 with a transmission 2 associated with the electric motor 1, and a power output 3 formed as a clamping chuck 4. From a not shown electric energy source 5, the electric motor 1 is supplied with the motor current 6 with interposition of a shell element 7 as well as a current detecting device 9 through not shown electrical connections, such as conductors 20. The electric screwdriver 19 has a nominal value setting 11 for the maximum permissible torque M', arranged in a housing 21 and provided with an operating element 14. In the housing 21 of the electric screwdriver 19, also a rotary speed detecting device 10 is provided. In this embodiment it is formed by an interrupter disc 22 fixedly coupled with a shaft 8 associated with the electric motor 1, and a fork light barrier 23. It is immaterial at which motor side the rotary speed detecting device is arranged. The control and/or regulating device 12 is located also in the interior of the housing 21 of the electric screwdriver 19. The components including the nominal value settings 11, the control element 12, the rotary speed detecting device 10, the current detecting device 9, and the load control element 7 are connected with one another via a not shown signal paths.

The user of the electric screwdriver 19 can adjust the maximum permissible torque M' on the force output element 3 via the nominal value setting 11 formed as the operating element 14. During starting of the electric screwdriver 19 by means of a switch 23 which is directly or indirectly associated with the load control element 7 or located in a current path, the motor current 6 is supplied to the electric motor 1. Its magnitude is registered by the current detecting device 9 and supplied to the control and/or regulating device 12 via the current signal 17. Simultaneously, the motor rotary speed m is determined by the rotary speed detecting device 10. The motor rotary speed m determined by the rotary speed detecting device is supplied via the rotary speed signal 16 to the control and/or regulating device 12. The latter determines from it only the rotary speed-dependent torque components adjusted due to the inherent kinetic energy of the rotating masses, when a corresponding load is applied to the force output 3.

As a difference between the preadjusted maximum permissible torque M' at the force output 3 and the preliminarily determined rotary speed-dependent torque component, the motor current-depending torque component is produced, which is set on the force output 3 with the corresponding load. From it directly the maximum permissible motor current I' is produced, which can be determined by computations by the control and/or regulating device or from a curve or a table read in an electronic component. Since the maximum permissible motor current I' producing only the motor current-dependent torque components depending on the rotary speed and thereby only a rotary speed-dependent torque components is changed, it is guaranteed that the sum of the both above mentioned torque components is not greater than the preadjusted maximum torque M'. When the rotary speed-dependent torque component is greater, then only the motor current-dependent torque component is correspondingly reduced. The control and/or regulating device takes into consideration understandably also a reduction of the only rotary speed-dependent torque component by increase of the motor current and thereby the only motor current-dependent torque component, so that on the power output 3 always at most the maximum permissible torque M' is set.

It will be understood that each of the elements described above, or two or more together, may also find a useful application in other types of methods and constructions differing from the types described above.

While the invention has been illustrated and described as embodied in torque limiting device for an electric motor, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

The invention claimed is:

1. A rotary speed limiting device for an electric motor, comprising a current detecting device for continuously detecting a motor current of the electric motor; a nominal value setting for adjusting a torque; a control and/or regulating device which limits the motor current to a maximum value depending on the nominal value setting; a rotary speed detecting device for indirectly detecting a rotary speed of the electric motor, wherein said rotary speed detecting device determines a rotary speed as a function of values of the motor current of the electric motor and a motor voltage of the electric motor, said control and/or regulating device determining a maximum value of the motor current depending on the rotary speed determined by said rotary speed detecting device, wherein a maximum permissible torque is pre-set by an operator, wherein the operator-set maximum permissible torque comprises a sum of first and second torque components, wherein the first torque component results from kinetic energy of rotating masses and the second torque component is a function of the motor current.

2. A rotary speed limiting device as defined in claim 1; wherein said control and/or regulating unit is formed so as to reduce the maximum value of the motor current when the rotary speed increases, in order to reduce the second torque component during operation.

3. A rotary speed limiting device as defined in claim 1; and further comprising a road control element which limits and/or turns off the motor current when the maximum value determined by the control and/or regulating device is reached.

4. A rotary speed limiting device as defined in claim 1, wherein said and/regulating device is formed as a microcontroller.

5. A rotary speed limiting device as defined in claim 1, wherein said control and/or regulating device includes a microcontroller.

6. A rotary speed limiting device as defined in claim 1, wherein said rotary speed detecting device detects the rotary speed via a rotary speed sensor formed as an element which registers revolutions of a shaft.

* * * * *